O. Scherenell,
Hollow Auger.

Nº 30,889.   Patented Dec. 11, 1860.

Witnesses:
J. V. Coombs.
R. S. Spencer

Inventor:
Oswald Scherenell
per Munn & Co
Attorneys

UNITED STATES PATENT OFFICE.

OSWALD SCHEVENELL, OF MARION, ALABAMA.

TENONING-TOOL.

Specification of Letters Patent No. 30,889, dated December 11, 1860.

*To all whom it may concern:*

Be it known that I, OSWALD SCHEVENELL, of Marion, in the county of Perry and State of Alabama, have invented a new and Improved Expanding Tenon-Cutter or Auger; and I do hereby declare that the following is a full, clear, and exact description of the same, reference being had to the accompanying drawings, making a part of this specification, in which—

Figure 1:
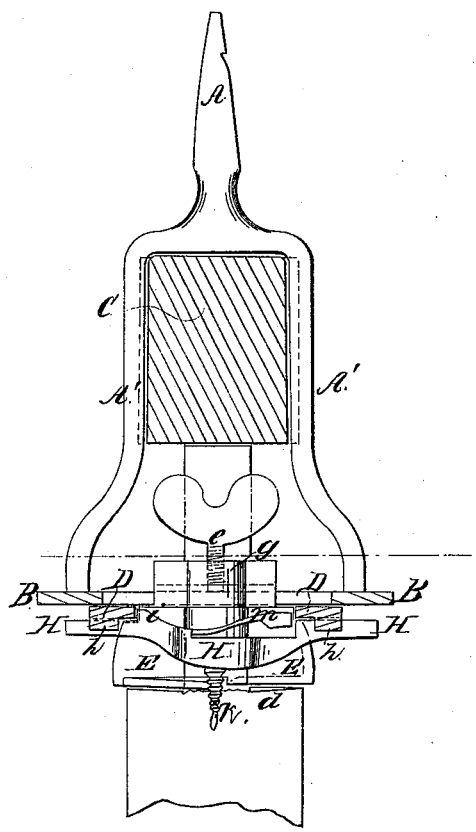
Figure 2:
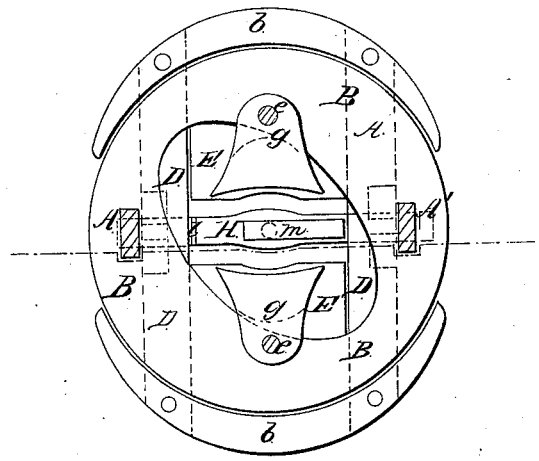
Figure 3:
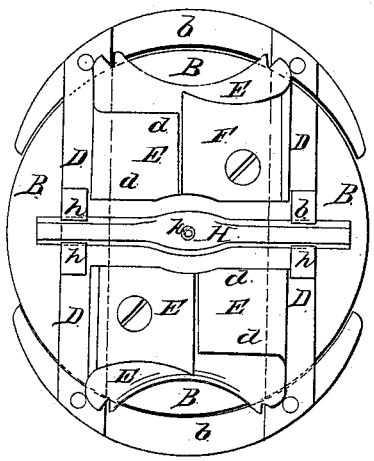

Figure 1 is a cross section taken through the improved tenon cutter, in the vertical plane indicated by the red line in Fig. 2. Fig. 2 is a top view of the instrument seen by removing the gage block and the arms which hold it. Fig. 3 is a bottom view of Fig. 2, showing the centering point attached.

Similar letters of reference indicate corresponding parts in the three figures.

The object of this invention is to form round tenons on the ends of spokes by means of an instrument which can be adjusted for cutting tenons of various diameters, and which will be self centering and require very little manipulation to adapt it to the work it is desired to perform.

My invention consists in combining with a circular plate with a large elliptical hole through it, and with a peculiarly shaped bit stock, to which said plate is secured two parallel guide bars, which are connected together at their ends by crescent shaped pieces, and which are fitted to the bottom of the circular plate and secured to this circular plate by clamp-screws, which screws at the same time secure the two cutting boxes in their proper places as will be hereinafter described. Said guide bars are furnished on their bottom surfaces and at the middle of the length of each with dove-tail grooves for receiving and holding a bar carrying the centering point for guiding the cutters properly to their work, at the commencement of the operation of forming the tenon as will be hereinafter described.

To enable those skilled in the art to make and use my invention I will proceed to describe its construction and operation.

A, is the tapering portion of a bit stock which fits into a common auger-brace handle and A′, A′, are two forked arms which are attached at their ends to a circular plate B, and which form a portion of the bit stock for carrying the cutters. Between the parallel portions of the arms A′, A′, is placed a gage block C, for regulating the length of the tenon to be cut as will be hereinafter described.

The circular plate B, being of the required diameter, an elliptical hole, shown in Figs. 1, and 2, of a suitable size is cut through this plate, which hole allows the tenon to pass up through it; and the edges of the plate B, surrounding this elliptical hole serve as a cam to set the cutting boxes at any desired distance apart as will be hereinafter described.

D, D, are two straight guide bars which are attached at their end to crescent shaped portions *b, b*, the inside edges of which conform to the circumference of the plate B, as shown in Figs. 2 and 3, of the drawings. These two bars are parallel to each other, and separated a suitable distance apart to receive the cutting boxes E, E. These two guide bars D, D, are secured to the underside of the portions *b, b*, so that when the bars are placed up against the bottom of plate B, the crescents *b, b*, will fit closely against the edge of this plate. The crescents *b, b*, will thus serve as guides and keep the bars D, D, in their proper places with relation to the axis of the instrument.

E, E, are the cutting boxes which carry on their undersides the straight edged knives F, F, secured to the boxes by screws, or in any suitable manner, and above the knives spaces are formed in the boxes which serve as throats to allow the chips to escape from the edges of the knives, and thereby keep them always clear, the solid bottom portions *d*, opposite the knives F, F, rest on the shoulders of the spoke and serve to keep the knives steady during the operation of cutting; and the ends of the cutting boxes E, E, nearest the center of the plate B, abut against the tenon and keep the knives, and the entire instrument properly centered; the ends of these boxes are slightly curved out for this purpose, as shown in Figs. 2 and 3, of the drawings. The boxes are formed on their top edges so as to fit snugly between the guide bars D, D, and up against the bottom of the plate B, and these boxes are secured in their positions by set screws *e, e*, which pass down, vertically through the lugs *g, g*, and bear against the top of plate B. The lugs *g, g*, for this purpose are cast with the boxes E, and project up from the inner ends of the boxes and over the tops of the boxes as shown in Figs. 1 and 2. These lugs are put up through the elliptical hole in plate B, and brought over the top of this plate so that the neck of each lug will abut against the inner edge of the plate B, as shown in dotted lines Fig. 2. The set screws $e$, $e$, will thus confine the boxes E, E, and the bars D, D, with their crescent portions $b$, $b$, rigidly to the plate B, and at the same time secure the boxes E, E, to the bars D, D, and to the plate B.

$h$ $h$, and $h$, $h$, are small elevations projecting from the middle and bottom of the bars D, D, which have dovetail grooves cut transversely through them for receiving a cross bar H, which has a gimlet or centering point $k$, projecting out from the middle of this bar; $m$, is a spring latch which is attached to the upper side of this bar and which flies out when the bar is in its proper place and catches against one of the guide bars D as shown in Figs. 1, and 2. This latch together with the shoulder portion $i$, on bar H, will confine the bar securely in its place and the gimlet point $k$, in the center of the instrument. The bar H, is made convex on its bottom side so as to throw the gimlet point $k$, slightly beyond the plane of the bottom of the boxes E, E, and knives F, F. This bar H, with its point $k$, can be removed from the bars D, D, by pressing down the spring latch $m$ and slipping the bar back in a direction with its length.

In using this instrument the length of the tenon to be cut is determined by using a gage block C, which can be readily removed and a longer or shorter one substituted in its place. In commencing the operation of cutting a tenon the centering point $k$, is used as shown in Figs. 1 and 3, for the purpose of starting the tenon an eighth, or a quarter of an inch, after which this point $k$, with its bar H, is removed as before described, and the work is completed without it.

The diameter of the tenon to be formed on the end of a spoke is determined and the knife boxes are adjusted by loosening the set screws $e$ $e$, holding the bars D, D, and turning the plate B, either to the right or to the left, and as the necks of the lugs, $g$, $g$, on the boxes E, E, each bear against the elliptical edge of the hole in the plate B, by turning this plate B, in the direction indicated by the arrows in Fig. 2, it will be seen that the boxes E, E, will be made to approach the center of the plate, B, simultaneously; and by reversing the motion of plate B, the boxes E, E, may be set back from the center of this plate, B. The knife boxes may thus be moved up to, or set back from, the center of the plate B, and the knives F, F, may be thus adjusted to cut a tenon of any desired diameter, after which the boxes E, E, are secured rigidly in place by the set screws $e$, $e$.

The required adjustment is made subsequent to the operation of centering, so that when the bar H, with its point $k$, is detached from the instrument the boxes E, E, will be at the proper distance from the axis of the spoke to finish the work without again adjusting them.

When the center point $k$, and its bar H, is removed, the tenon passes up between the boxes E, E, and the instrument is turned until the end of the tenon touches the lower end of block C, when the knives will cease to cut.

It will now be seen from the above description of my expanding or adjustable tenon cutter, that the entire work of forming a tenon of any required diameter or length can be performed in an accurate manner, that the tenon is started with the centering gimlet point $k$, after which the work is completed without this centering point.

Having thus described my invention what I claim as new and desire to secure by Letters Patent, is—

1. The portions A, A′, A′, the circular plate B, with its elliptical hole, the parallel bars D, D, with the crescent pieces $b$, $b$, in combination with the knives F, F, knife boxes E, E, and their lugs $g$, $g$, and set screws $e$, $e$. All constructed, arranged and operating substantially in the manner and for the purposes herein set forth.

2. In combination with the plate B, and parallel bars D, D, the bar H, with its centering point $k$, when said bar is attached to the instrument substantially as and for the purposes specified.

OSWALD SCHEVENELL.

Witnesses:
W. B. CATHEY,
JOSIAH WHITMAN.